May 19, 1970          L. L. PREM          3,513,336
METHOD FOR CONTROLLING A POWER GENERATING SYSTEM
Filed July 13, 1967          2 Sheets-Sheet 1
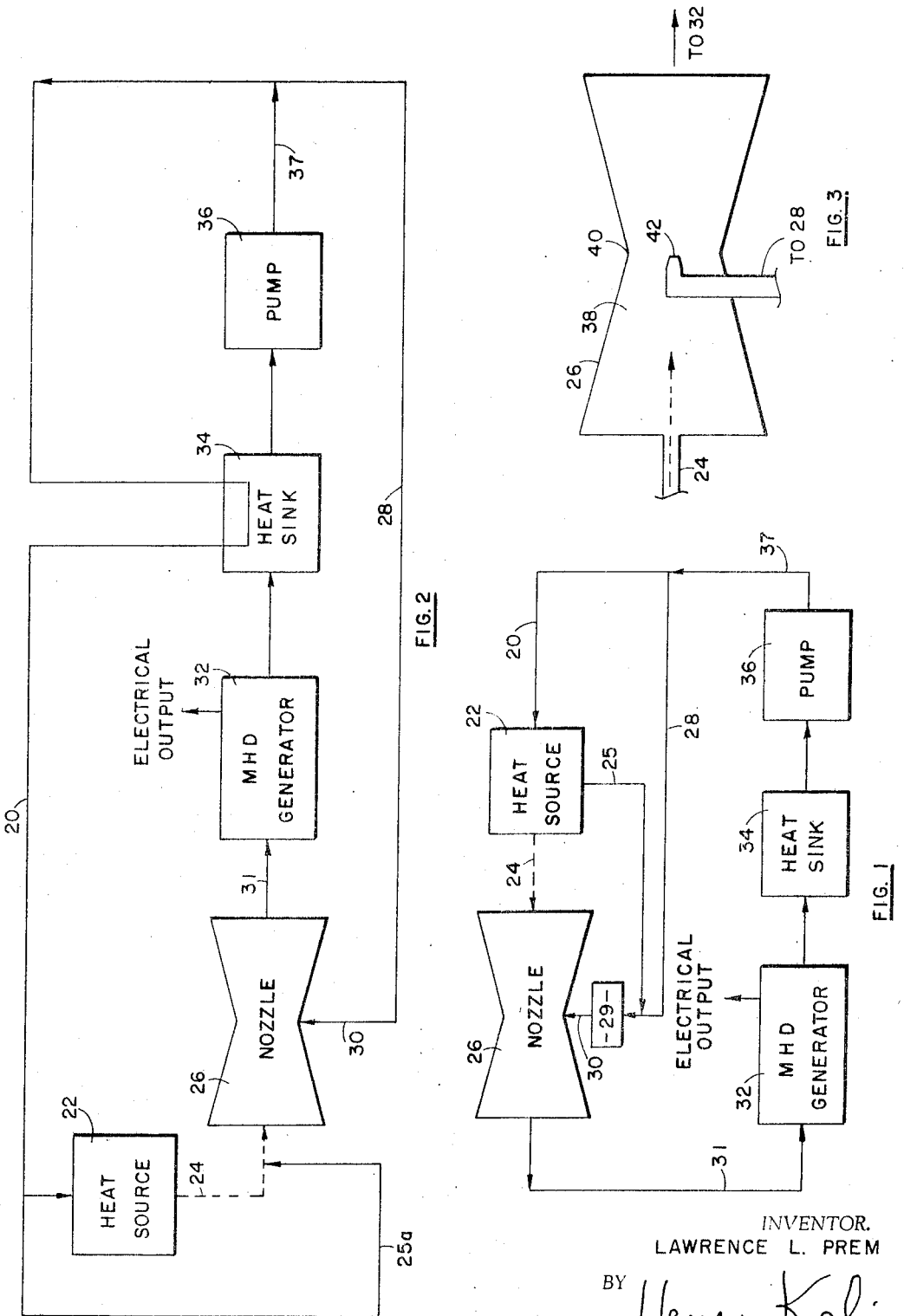
INVENTOR.
LAWRENCE L. PREM
BY Henry Kolin
ATTORNEY

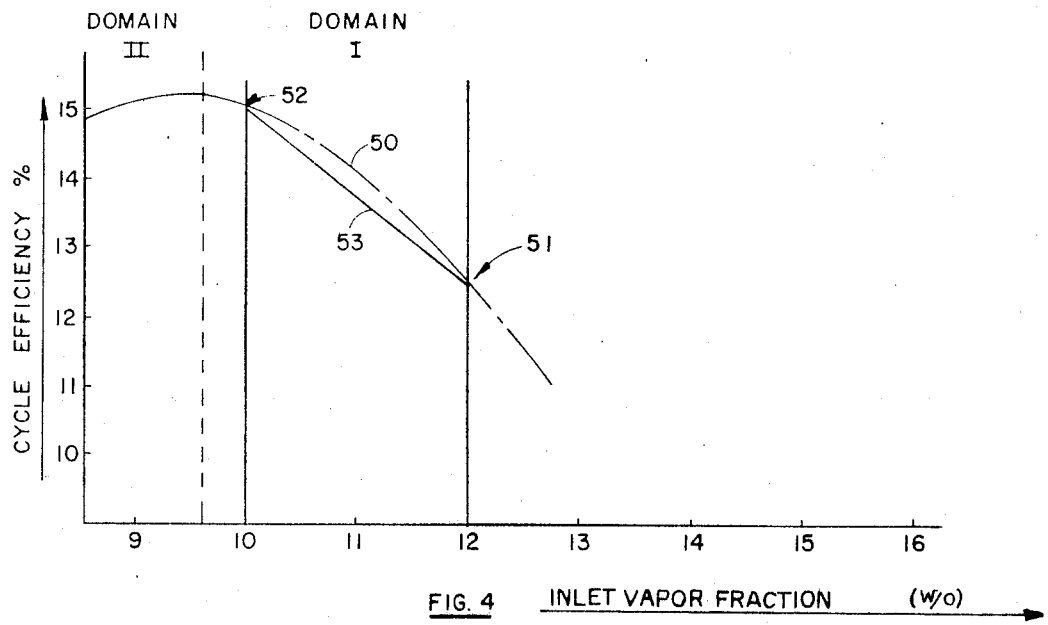
FIG. 4 INLET VAPOR FRACTION (w/o)
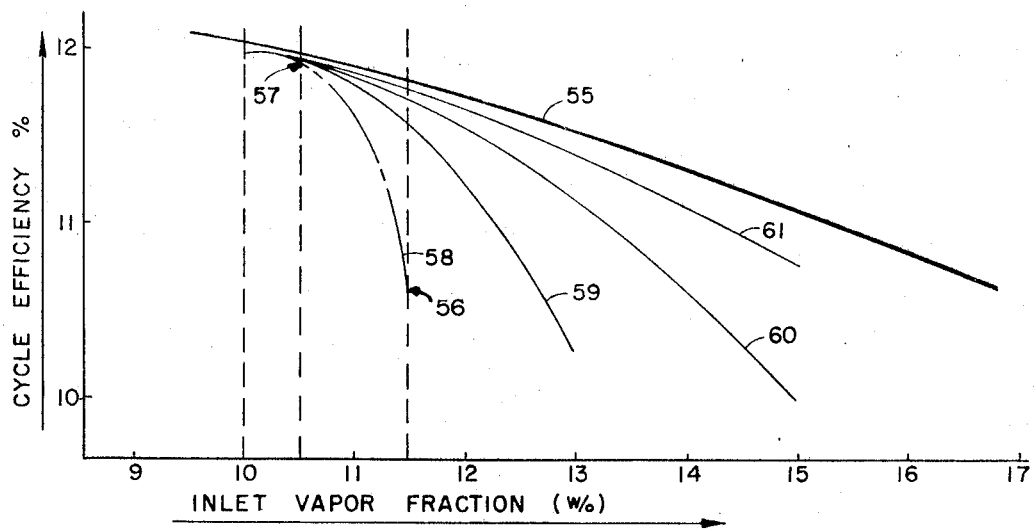
FIG. 5 INLET VAPOR FRACTION (w/o)
INVENTOR.
LAWRENCE L. PREM
BY Henry Kolin
ATTORNEY United States Patent Office 3,513,336
Patented May 19, 1970

3,513,336
METHOD FOR CONTROLLING A POWER
GENERATING SYSTEM
Lawrence L. Prem, Tarzana, Calif., assignor to North
American Rockwell Corporation
Continuation-in-part of application Ser. No. 295,125,
July 15, 1963. This application July 13, 1967, Ser.
No. 653,142
Int. Cl. H02n 4/02
U.S. Cl. 310—11                              9 Claims

ABSTRACT OF THE DISCLOSURE

A method for controlling variation of electrical energy output with time from a power-generating system in which a heat source supplies a decreasing thermal energy output with time to a magnetohydrodynamic system for the conversion of thermal energy to electrical energy utilizing a conductive fluid moving in a transverse magnetic field. By preselecting the initial vapor content of the utilized fluid to have a desired value of negative conversion effect in which overall thermal-to-electrical conversion efficiency varies inversely with initial vapor content of the fluid, a decrease in supplied thermal energy which would ordinarily result in a decrease of electrical energy output is compensated for by a simultaneous increase in the overall conversion efficiency so that variation in the resultant output of electrical energy with time is minmized.

CROSS REFERENCES TO RELATED
APPLICATIONS

This application is a continuation-in-part of application S.N. 295,125, filed July 15, 1963, now abandoned, and assigned to the assignee of the present application. The present invention is of particular utility for controlling variation in electrical output which would ordinarily occur in practicing the process shown in application S.N. 470,320, filed June 28, 1965, now U.S. Pat. 3,320,444, under conditions where the thermal energy input to the process decreases with time.

BACKGROUND OF THE INVENTION

The present invention relates to the direct conversion of thermal energy to electrical energy utilizing the principles of magnetohydrodynamic conversion. It particularly relates to a method for controlling a varying electrical energy output from such a process resulting from a decreasing thermal energy input to the process.

Basically, magnetohydrodynamic (MHD) power generation is an application of Faraday's general principle that electromotive forces are generated when a conductor moves in a transverse magnetic field. In various concepts for attempting the direct conversion of heat to electricity, both plasma and liquid metal have been considered as the "moving conductor." However, many problems are present, particularly those relating to the efficiency of the thermal-to-electrical conversion and the conductivity of the "moving conductor," which require solution for realization of a commercially usable system providing significant generation of electricity. In some proposed plasma or gas MHD systems, a high velocity ionized gas or plasma has been suggested for use as the conductor that interacts with the magnetic field. However, extremely high temperatures are required to achieve significant conductivity of the plasma; consequently, problems of corrosion and plasma containment are severe. Attempts at nonthermal ionization of the high velocity gas so as to permit operation at lower temperatures present many other difficulties.

Because of the greater conductivity of a liquid metal compared with a gas or plasma, several schemes have been proposed for passing a liquid metal through an MHD generator. Thus, in U.S. Pat. 3,158,764, a high velocity vapor is used as propellant for an conductive liquid The resultant liquid-vapor mixture is of relatively low conductivity and the poorly conductive vapor must first be removed from the mixture prior to entry of the liquid metal in the generator in order to obtain any significant generation of electricity. The use of mechanical separation for effective removal of this vapor, as proposed in this patent, ordinarily poses a major problem in vapor-liquid separation.

In U.S. Pat. 3,320,444, a high velocity liquid metal is also passed through an MHD generator. However, thermodynamic rather than mechanical means are utilized so as to substantially eliminate any vapor content from the liquid entering the MHD generator. As described in this patent to which reference should be made for fuller details of the process, a heat source is utilized to provide a partially vaporized fluid, which then has a portion of its thermal energy converted to kinetic energy. A subcooled liquid is next injected into the high velocity vaporized fluid. There then occurs a simultaneous interchange of energy so that the vapor portion of the vaporized fluid condenses out because of heat transfer between this vaporized fluid and the subcooled liquid; at the same time the kinetic energy of the vaporized fluid is transferred to the subcooled liquid. The resultant highly conductive working fluid or high kinetic energy and of very low or no vapor content then passes through the magnetic field of the MHD generator.

In power-generating systems in which a thermal energy input to the system is converted to electrical energy, a decrease in the thermal energy output of the heat source usually occurs for reasons such as reduced battery energy, heat transfer service fouling, or, in the case of a nuclear reactor, nuclear fuel burnup and poison buildup, unless fully compensated for in the latter case by the use of burnable poisons or like techniques. This reduced heat input to the system ordinarily results in a corresponding decrease in output of electrical energy. The present invention provides a method of controlling and minimizing this varying electrical energy output with time which would be obtained from a power generating system because of decreasing thermal energy output of a heat source utilized in such a system. Although not limited thereto, the present process is particularly suitable for use in conjunction with the method of converting thermal energy directly to electrical energy described in the aforesaid U.S. Pat. 3,320,444.

SUMMARY OF THE INVENTION

It is an object of the present invention to provide a method for controlling variation of the electrical output of a power generating system resulting from utilization of a heat source having a decreasing thermal energy output with time.

In accordance with the present invention, the value of the initial vapor content of the fluid utilized in a thermal-to-electrical energy power-generating system is preselected so as to have a desired value within a region of negative conversion effect. The term "negative conversion effect" refers to an observed inverse relationship between initial vapor content of the vaporized fluid and the overall thermal-to-electrical conversion efficiency. Thus, a decrease in supplied thermal energy which decreases the kinetic energy of the utilized fluid and thus ordinarily would result in a decrease of electrical output, also decreases the vapor content of the fluid and thereby increases the overall conversion efficiency because of this negative conversion effect. This increase in conversion efficiency acts to compensate for any decrease in electrical energy output which would ordinarily occur to thereby minimize variation of electrical energy output with time.

BRIEF DESCRIPTION OF THE DRAWING

FIG. 1 is a schematic diagram of a direct conversion system in which the method of the present invention may be utilized;

FIG. 2 is a schematic diagram of a second system in which the method of the present invention may be utilized;

FIG. 3 is a diagrammatic representation of the nozzle arrangement utilized in the systems of FIGS. 1 and 2;

FIG. 4 graphically illustrates the relation for the general case between power conversion efficiency and initial vapor fraction of the fluid prior to increasing its kinetic energy; and FIG. 5 graphically illustrates the relationship shown in FIG. 4 as applied to a spedific embodiment of the present invention.

DESCRIPTION OF THE PREFERRED EMBODIMENTS

The practice of the present invention, although not limited thereto, will be particularly illustrated and describes with respect to the process shown in U.S. Pat. No. 3,320,444, the disclosure of which is incorporated herein by reference. FIGS. 1 and 2 herein illustrate the principal features of a preferred embodiment shown in this patent.

Referring now to the drawings in detail, FIG. 1 shows a schematic diagram of a system utilizing the method of the present invention, which comprises a first conduit 20 which introduces an electrically conductive fluid containing one or more components, at least one of which is vaporizable, into a heat source 22, including a boiler, in which the liquid is raised to a temperature higher than or equal to its vaporization temperature. The vapor phase of the conductive fluid, shown by dashed lines at 24, is passed to a means 26, indicated as a nozzle in this system, where the kinetic energy of the vapor is increased, e.g., by expansion, while simultaneously the thermal energy of the vapor is decreased, so that a high velocity driving vapor streams results. The vapor phase entering means 26 may be either a wet, saturated or superheated vapor. If a combination of liquids is used, two of which are vaporizable at different temperatures, then a second liquid may be conducted through an optional conduit 25 and mixed with the subcooled liquid flowing through a conduit 28. Where a single component liquid is utilized, conduit 28 contains a flowing subcooled stream of the same liquid which is vaporized. The subcooled liquid is conducted through a regulator 29 and enters nozzle 26 at point 30. The subcooled liquid is injected into the driving stream of vapor at a single point or using multiple injection so that the kinetic energy of the driving stream will be transferred to the subcooled liquid. The point or points of injection of the subcooled liquid are preferably located at the nozzle constriction but may be located at any point or points in the nozzle so long as the injection is accomplished into a driving stream, i.e., at any of one or more points where at least a portion of the thermal energy of the vapor has been converted to kinetic energy. The pressure or flow regulator 29 controls the conditions for the injection of the subcooled liquid into the vapor stream in nozzle 26. The resulting fluid, which initially contains both liquid and vapor phases of the working liquid is in the form of a fog. This permits a free exchange of thermal energy by direct mixing between the two phases when maintained in this condition for a time sufficient to ensure that the greater or entire portion of the vapor is condensed by mass heat transfer with the subcooled liquid and also that the kinetic energy of the vapor is transferred to the subcooled liquid. In this manner the resulting conductive working fluid in a conduit 31 upon entering an MHD generator 32 consists essentially of the liquid phase, i.e., with the vapor phase preferably being present in an amount below 50 percent by volume, generally less than about 30 percent by volume so that high electrical conductivity is maintained. Since this high electrical conductivity fluid is required in generator 32 for operable conversion of the kinetic energy of the resulting fluid to electrical energy, the weight of the vapor fraction must be maintained at a small percentage of the weight of resulting fluid. For a representative alkali-metal conductive working fluid, a vapor phase of less than about 30 percent by volume would correspond to a vapor fraction of less than about 0.5 weight percent. After converting a large portion of the kinetic energy to electrical energy in generator 32, the remaining kinetic energy may be converted to static pressure by passage through a diffuser (not separately shown) and/or additional heat may be removed by the use of a heat exchanger or radiator indicated generally as a heat sink 34. The liquid is then pumped by means of a pump 36, which may be omitted if sufficient pressure is present, through a conduit 37 to the input connection of conduits 20 and 28, which respectively form part of the vapor and liquid loops of the system.

Considering the system shown in FIG. 1 and its operation as described with respect to a particular fluid utilized and a particular set of conditions of operation, a fluid of sodium is pumped by pump 36 into conduit 20 at a temperature of 1215° F. and a pressure of 100 p.s.i.a. and then conducted to heat source 22. Any of various well known heat sources may be used. The purpose of the heat source is to raise the temperature of the sodium from 1215° F. to a temperature corresponding to or above the vaporization temperature of sodium, which is 1975° F. in a preferred embodiment. In this embodiment the optional conduit 25 is not required. The wet, saturated or superheated vapor at 1975° F., allowing for a pressure drop through the heat source of 30 p.s.i.a., has a flow rate of 32.5 lb./sec. through conduit 24 and is fed into nozzle 26.

Referring to FIG. 3, which shows a detailed view of nozzle 26, the entering vapor is expanded in a chamber 38 of nozzle 26 where a portion of the thermal energy of the vapor is converted to kinetic energy to form a driving stream at a reduced temperature of about 1640° F. This driving stream is passed through a constricted portion 40 of nozzle 26, at which point, or downstream of this point, the subcooled liquid is preferably injected, as at 42, in a direction parallel to the direction of flow of the driving fluid in order to promote momentum exchange between the two fluids. However, injection in the opposite direction or at an angle to the vapor flow direction may also be used. With sodium vapor entering nozzle 26 at a temperature of 1975° F. and a subcooled liquid at 1215° F., i.e., subcooled by about 760° F., approximately 11 lb. of subcooled liquid must be injected into the vapor stream at 42 for every pound of saturated sodium vapor injected into nozzle 26 in order to condense almost all the sodium vapor and provide sufficient kinetic energy to obtain 350 ft./sec. working fluid velocity at the entrance to generator 32.

In order to attain mass heat transfer as well as interchange of kinetic energy between the vapor and the subcooled liquid, a certain minimum time is required before the vapor fraction, i.e., the weight of vapor to the total weight of liquid and vapor of the fluid, is sufficiently low so that the use of a standard MHD converter operating on a nonionized, electrically conducting liquid medium is feasible. For the particular medium utilized in the preferred embodiment, it can be shown that both the mass heat transfer required and the acceleration of liquid necessary to obtain a resulting fluid useful in MHD direct conversion devices will take place in a small fraction of a second. Thus, the vapor fraction is reduced rapidly so that the distance between the point of injection of the subcooled liquid and the introduction of the resulting fluid into a direct conversion device is relatively short, e.g., between about 1 and 10 feet.

Magnetohydrodynamic generators, such as generator 32, which employ liquid metals are well-known in the art in the form of direct- and alternating-current electromagnetic pumps and flow meters. In such direct-current pumps the liquid metal flows between magnetic poles and receives direct current from conductors perpendicular to the magnetic field. The resulting electromagnetic force pumps the liquid. Other types of pumps are shown in U.S. Pats. 2,764,095; 2,798,434; and 2,940,393; and reference should be made thereto for fuller details. Such pumps may be utilized as generators by imparting a force to the liquid metal, thereby forcing the liquid through the magnetic field which will generate a voltage across the terminals. The electrical output of generator 32 may then be used in any known manner.

The temperature of the 1640° F. liquid entering generator 32 will be changed to an extent dependent upon the particular design of the MHD converter and the friction of the liquid resulting from such a design. The fluid at the outlet of generator 32 will be reduced in velocity to about 250 ft./sec. from the 350 ft./sec. input velocity by the extraction of energy. The remaining kinetic and thermal energy present may be converted to static pressure or transferred to other fluids by use of a diffuser, and a heat exchanger may be utilized having a secondary heat-exchanging fluid for additional power generation, or a diffuser and condensers may be used, all of which are contemplated for use in the present invention and are indicated generally as heat sink 34. The remaining thermal energy or heat content of the fluid leaving generator 32 may be utilized in any ordinary energy conversion system, e.g., for the generation of steam.

The output of heat sink 34 is directed through pump 36 so that at the output of pump 36 a pressure of at least about 100 p.s.i.a. is maintained in both conduits 20 and 28 of the system.

FIG. 2 is a modification of the system of FIG. 1 in that the operating conditions are substantially changed to provide for less quantity flow in the liquid loop with resulting reduced inventory for fluid storage and pumping power and to provide a more efficient system by requiring a smaller fraction of the resultant working fluid to be accelerated by means of the kinetic energy exchange. Corresponding parts are marked with corresponding reference numerals. In this system conduit 20 is utilized as part of a cooling loop for heat sink 34 so that the liquid fed into heat source 22 is at a substantially higher temperature than the subcooled liquid in conduit 28. This same arrangement could be utilized in the system of FIG. 1. In FIG. 1 optional conduit 25 was utilized as a means for atomizing the subcooled liquid in conduit 28 as it was injected into nozzle 26 at point 30. In the system of FIG. 2 a conduit 25a is utilized as a means for controlling the quality of the fluid at the inlet to nozzle 26. With the particular operating parameters of FIG. 2 a 10 percent vapor fraction is taken as the optimum at the inlet to nozzle 26. In order to maintain this fraction, the liquid in conduit 25a is mixed with the vapor in conduit 24. Suitable valves and controls, not shown, for adjusting the relative flow rates may be provided.

Table I shows the approximate operating parameters for the systems of FIGS 1 and 2 where three different operating conditions are shown for FIG. 2, i.e., superheated vapor, saturated vapor, or wet vapor in conduit 24. It should be noted that supercritical conditions could also be utilized in this system, if desirable. Two of these operating conditions utilize conduit 25a through which the liquid (potassium) at 1400° F. is mixed with the vapor flowing through conduit 24 prior to its injection into nozzle 26. The remainder of the system, including the expansion of the fluid entering nozzle 26 to convert its thermal energy to kinetic energy and the transfer of this kinetic energy to the subcooled liquid injection at point 30 into nozzle 26, is the same as for the system of FIG. 1. The interchange of energy and the various parameters of the above-described systems are described in detail in U.S. Pat. 3,320,444.

TABLE I.—APPROXIMATE OPERATION PARAMETERS FOR VARIOUS POSITIONS IN FIGS. 1 AND 2

| Position on Fig. 1 or 2 | Fig. 1, sodium, 100% vapor quality | Fig. 2, potassium superheated vapor | Fig. 2, potassium saturated vapor | Fig. 2, potassium wet vapor (10 wt. percent) |
| --- | --- | --- | --- | --- |
| 24 | 1,975° F., 200 ft./sec., 32.5 lb./sec., 70 p.s.i.a. | 2,240° F., 150 p.s.i.a., 5.9 lb./sec. | 2,000° F., 150 p.s.i.a., 6.2 lb./sec. | 2,000° F., 150 p.s.i.a., 30 lb./sec. |
| 25 or 25a | None | 24.1 lb./sec. 1,400° F., 150 p.s.i.a. | 23.8 lb./sec., 1,400° F., 150 p.s.i.a. | None. |
| 31 | 1,640° F., 17 p.s.i.a., 350 ft./sec. | 1,400° F., 14.7 p.s.i.a., 63 lb./sec. | 1,400° F., 14.7 p.s.i.a., 63 lb./sec. | 1,400° F., 14.7 p.s.i.a., 63 lb./sec. |
| 37 | 1,215° F., 100 p.s.i.a., 392.5 lb./sec. | 650° F., 150 p.s.i.a., 63 lb./sec. | 650° F., 150 p.s.i.a., 63 lb./sec. | 650 °F., 150 p.s.i.a., 63 lb./sec. |
| 20 | 1,215° F., 100 p.i.s.a., 32.5 lb./sec. | 1,400° F., 150 p.s.i.a., 30 lb./sec. | 1,400° F., 150 p.s.i.a., 30 lb./sec. | 1,400° F., 150 p.s.i.a., 30 lb./sec. |
| 28 | 1,215° F., 360 lb./sec., 15 ft./sec. | 650° F., 33 lb./sec., 150 p.s.i.a. | 650° F., 33 lb./sec., 150 p.s.i.a. | 650° F., 33 lb./sec., 150 p.s.i.a. |
| 30 | 1,215° F., 360 lb./sec., 100 p.s.i.a. | Same as 28 | Same as 28 | Same as 28. |

In each of the systems of FIGS. 1 and 2, the electrical output obtained from MHD generator 32 for a given magnetic flux will be a function of the conductivity and kinetic energy of the conductive liquid entering the generator through conduit 31. The properties of this resultant working liquid are in turn prior-determined by the interaction between the high velocity driving stream and the injected subcooled liquid in nozzle 26. The properties of the driving stream in turn depend upon the properties of the first vaporized fluid entering nozzle 26, this first fluid then forming the driving stream by having portion of its thermal energy converted to kinetic energy by expansion in the nozzle. It has been found that the power conversion efficiency of the process, i.e., the ratio of electrical energy output from geneartor 32 to total heat energy input to the system by way of conduit 24 into nozzle 26, will be dependent, for a given thermal energy content of the input fluid, upon the vapor fraction or quality of this fluid. Thus, for a given fluid temperature, by preselecting the vapor fraction of the fluid in conduit 24 entering nozzle 26, the electrical output of generator 32 can be controlled.

Referring to FIG. 4, curve 50 shows the power conversion efficiency at constant electric power output from generator 32 as a function of vapor quality (weight percent) of the fluid at the inlet to nozzle 26. In the system shown in FIG. 1, the vapor content of the output fluid from heat source 22 is essentially equivalent to that of the inlet fluid to nozzle 26. For FIG. 2, there may be a mixing of the fluids in conduits 24 and 25a prior to entry in nozzle 26. It is clear from the form of curve 50, which is essentially of the same form for Cs, Rb, Hg, and Na, that if point 51 is the assumed start-up operating point with an inlet quality or vapor fraction of 12 weight percent (w/o) and a conversion cycle efficiency of 12.5 percent, a reduction of inlet quality of the fluid entering nozzle 26 will move the operating point upwardly on curve 50, i.e., in the direction of higher cycle efficiency. If the end of operating life point is taken as point 52, the inlet quality of this fluid entering nozzle 26 will have deteriorated to 10 (w/o). For a fluid of given heat content of enthalpy, such a decrease in vapor fraction may readily occur for a given set of operating conditions by a degradation of about 13% in the heat provided by heat source 22. Ordinarily, a degradation in the thermal energy supplied to the vaporizable fluid prior to entry in nozzle 26 results in a consequent decrease in its vapor fraction and kinetic energy and would ultimately result in a lowered output of electrical energy obtainable from generator 32. However, because of the relationship between vapor fraction and overall cycle efficiency, as shown in FIG. 4, for a gievn range of vapor fraction values (Domain I) a decreasing fluid quality will be associated with an increasing conversion efficiency. Thus, at point 52, an inlet quality of 10 w/o will correspond to a conversion efficiency of 15%. Thus, any potential reduction in electric power output because of a degradation in the heat supplied to the initial or first fluid may be completely offset by increased cycle efficiency. In the described system operating between points 51 and 52, the relationship between vapor fraction and efficiency during the operating life would be more closely represented by a straight line 53. Thus, within selected vapor fraction limits for the systems of FIGS. 1 and 2, a reduction in the vapor fraction of the first fluid delivered to nozzle 26 will increase the overall conversion efficiency of the system. However, since the increase in conversion efficiency is obtained because of a reduction in the total thermal energy delivered by the heat source to the system, this increase in efficiency can be made, by appropriate parameter selection, to maintain constant the electrical output generation over a period of time in which reduced power generation would otherwise occur.

Total compensation, however, is limited to certain parameter values, while partial compensation may be attained in every case as will be more apparent hereafter. The primary parameter selection required to achieve compensation for heat source degradation is herein referred to as negative conversion effect. This effect is readily apparent from FIG. 4 which shows the inlet vapor quality of the fluid entering nozzle 26 as a function of cycle efficiency for a plurality of working fluids. A thermal-to-electrical energy conversion system is considered to show a negative conversion effect when a decrease in the quality or vapor fraction of the fluid is inversely related to the overall power conversion efficiency. The negative conversion effect is shown in FIG. 4 as that portion of each curve which lies to the right of the maximum points, i.e., that portion of the curve having a negative slope. This negative conversion effect portion is related to the overall conversion efficiency in the following manner: as the vapor fraction of the initial fluid decreases, the cycle efficiency increases.

The negative conversion effect is utilized in the present invention to totally or partially compensate for degradation of the heat source thermal output. It is characteristic of any heat source which delivers a wet, saturated, or superheated fluid at a temperature where at least part of the delivered fluid is vapor that as the heat input to the fluid decreases, the vapor fraction of the delivered fluid is reduced. The decrease in heat input to the fluid results from the degradation of thermal performance whether the heat source is a battery powered electric heater, a combustion chamber or a nuclear reactor. While the degradation may result because of a variety of reasons, reduced battery output, fouling of surfaces and fuel burnup are representative for the examples cited.

The method of the present invention will be described with respect to the above systems where the heat source is a nuclear reactor. In a nuclear reactor the core reactivity may be expressed as $$\rho = \rho_o + \rho_t - \rho_B + \rho_R$$

where $\rho_o$ is the inital core reactivity, $\rho_t$ is the reactivity due to temperature effect, $\rho_B$ is the drop in reactivity due to burnup, neutron poison building and fuel depletion, and $\rho_R$ is the reactivity added by withdrawing control rods from the core. For stable operation $\Delta\rho$ must equal zero, and the condition is usually maintained by moving the control rods in and out of the reactor to compensate for burnup.

$$\Delta\rho = +\Delta\rho_t - \Delta\rho_B + \Delta\rho_R$$

where $$\Delta\rho_t \cong (\pm\alpha)\Delta Tav$$

The core temperature affects the core thermal output, and the relationship may be written as $$Tav = f(Q_c)$$

when $Q_c$ is the reactor core thermal output. Assuming the reactor has no control rods, or that the control rods have been completely removed from the reactor core after a period of operation, then $$\Delta\eta Q_c + \Delta Q_c \eta = O, \text{ or}$$

$$\alpha \Delta Tav = \Delta\rho_B$$

Since $Tav = f(Q_c)$ $$\Delta Tav = C\Delta Q_c \text{ and}$$

$$\Delta Q_c = \Delta\rho_B/\alpha C$$

When $\alpha$ is negative, i.e., the overall temperature coefficient of reactivity is negative, which is the usual case for reactors well-known in the art, $\Delta Q_c$ will be negative, i.e., the reactor core themal output will decrease because of fuel burnup. A portion of this thermal output is used to generate electrical power, $W_e$, and the remainder is lost, i.e., radiator and heat sink losses, $$W_e = \eta Q_c$$

Where $\eta$ is the cycle efficiency at constant power output, $W_e$ and $\eta Q_c$ are equal to a constant. If any changes occur in $\eta$ or $Q_c$, the equilibrium is maintained when $$\Delta\eta Q_c + \Delta Q_c \eta = O$$

$$\Delta Q_c = \frac{Q_c \Delta\eta}{\eta}$$

$$\frac{\Delta P_B}{\alpha c} = \frac{Q_c \Delta\eta}{\eta}$$

$$\Delta P_B = -\frac{Q_c \Delta\eta}{\eta} \alpha c$$

where $\Delta\eta = \eta_B - \eta_A$ where $\eta_B$ and $\eta_A$ are the efficiencies at points 52 and 51, respectively, on the curve of FIG. 4. When $\alpha$ is negative $\Delta Q_c$ is also negative and $\Delta\rho_B$ and $\Delta\eta$ are both positive. The domain showing a negative conversion effect, Domain I, to the right of the optimum point in FIG. 4, satisfies these conditions. When $\alpha$ is positive a Domain II to the left satisfies similar conditions. This above treatment indicates in a general manner that as the inlet quality decreases, i.e., as the thermal output of the nuclear reactor decreases, the efficiency of the power producing cycle increases.

The characteristics of the heat sources and the thermal-to-electrical energy conversion system are combined in the present invention to provide total or partial compensation for degarding thermal performance of the heat source. These combined characteristics as utilized in the present invention are graphically illustrated in FIG. 5 for a fluid of potassium although other utilizable fluids or combinations of such fluids will result in similar relationships. FIG. 5 shows the relationship between inlet fluid quality, i.e., at the entrance to nozzle 26, and the cycle efficiency for several cases. Curve 55 is the negative temperature effect portion of the curve for a potassium fluid and represents the optimum condition for best quality inlet fluid for a given efficiency. A starting point 56 is taken as 11.5 percent vapor fraction. For this 11.5 percent vapor fraction, the injection rate to the nozzle and corresponding fluid injection temperature will result in an optimum condition for cycle efficiency at a 10.5 percent vapor fraction operating condition. Thus, point 57 corresponding to the 10.5 w/o condition is selected as the end of compensated life. The thermal conversion efficiency difference between these two points, plus the decreased electrical resistivity due to the reduced vapor fraction will result in an increase in overall cycle efficiency as shown generally by curve 58. As the thermal performance of the heat source degrades and the vapor fraction of the inlet fluid decreases, the operating point will move from point 56 to point 57 along a curve such as 58. In this example total compensation is accomplished and preferably represents a system operating in an unattended condition. The heat source degradation is taken as about 12 percent for this example where the reduced heat output results in a decrease in the vapor fraction of the fluid from 11.5 to 10.5 w/o. The corresponding increase in cycle efficiency, i.e., from 10.6 to 11.8 percent, represents an increase in efficiency of more than 11 percent. Assuming a linear relationship between heat source degradation and resultant decreased output of electrical energy, essentially total compensation may thus be accomplished and the electrical output of the system will remain substantially constant.

Where constant electrical output is not essential and total compensation not required, curves 59–61 or similar curves connecting preselected starting points with a preselected optimum end-of-compensated-life point may be utilized. Further, other utilizable fluids characterized by curves similar to 55 but having greater or lesser slopes may be selected depending upon the system output requirements.

While a particular and preferred embodiment of the present invention and its principle of operation have been illustrated and described, it should be understood that within the scope of the appended claims the invention may be practiced otherwise than as specifically illustrated and described.

I claim:
1. A method for controlling variation of electrical energy output with time from a power-generating system wherein
  (a) a heat source supplies a decreasing thermal energy output with time to a thermal-to-electrical energy conversion system in which the thermal energy of a fluid having a vapor content is converted to electrical energy,
  (b) said conversion system being characterized by a region of negative conversion effect in which the overall thermal-to-electrical conversion efficiency varies inversely with initial vapor content of said fluid, comprising
  (c) preselecting the initial vapor content of said fluid so that said vapor content has a desired value within the region of negative conversion effect which is below the peak value whereby
  (d) a decrease in supplied thermal energy to said fluid which decreases its vapor content and would ordinarily result in a corresponding decrease in output of electrical energy is compensated for by a simultaneous increase in the overall conversion efficiency so that variation in the resultant output of electrical energy from said power-generating system is minimized.
2. The method of claim 1 wherein said heat source is a nuclear reactor.
3. The method of claim 1 wherein said fluid includes an alkali metal.

4. In a method for generating power by converting thermal energy to electrical energy wherein
  (a) a heat source supplies a decreasing thermal energy output with time to a thermal-to-electrical energy conversion system in which the thermal energy of a fluid having a vapor content is converted to electrical energy,
  (b) said conversion system being characterized by a region of negative conversion effect in which the overall thermal-to-electrical conversion efficiency varies inversely with initial vapor content of said fluid,
  (c) the conversion process in said conversion system comprising the steps of
    (1) forming a first fluid having a preselected vapor fraction for a given amount of thermal energy supplied to said first fluid, said vapor fraction decreasing with decreased supply of thermal energy,
    (2) increasing the kinetic energy of said first fluid while simultaneously decreasing its thermal energy to form a driving stream,
    (3) mixing said driving stream with a subcooled liquid so that a substantial portion of the vapor of said driving stream will condense out because of heat transfer between said driving stream and said subcooled liquid while simultaneously transferring kinetic energy of the vapor of said driving stream to said subcooled liquid to form a resulting working fluid, and
    (4) converting the kinetic energy of said resulting working fluid to electrical energy,
  (d) the improvement in said power-generating method to control variation in electrical energy output resulting from a decrease in supplied thermal energy, comprising
    (1) preselecting the initial vapor content of said first fluid so that said vapor content has a desired value within the region of negative conversion effect which is below the peak value whereby
    (2) a decrease in supplied thermal energy to said first fluid which decreases its vapor content and would ordinarily result in a corresponding decrease in output of electrical energy is compensated for by a simultaneous increase in the overall conversion efficiency so that variation in the resultant output of electrical energy from said power-generating system is minimized.
5. The method of claim 4 wherein said heat source is a nuclear reactor.
6. The method of claim 4 wherein said first fluid includes an alkali metal.
7. The method of claim 4 wherein said first fluid has a negative conversion effect for vapor fractions greater than about 5 percent by weight.
8. The method of claim 4 wherein said first fluid is selected from the class of wet, saturated, and superheated fluids.
9. The method of claim 4 wherein said resulting fluid entering generator 32 contains less than about 30 percent by volume of vapor.

References Cited
UNITED STATES PATENTS

| | | | |
|---|---|---|---|
| 3,294,989 | 12/1966 | Eichenberger | 310—11 |
| 3,401,277 | 9/1968 | Larson | 310—11 |
| 3,320,444 | 5/1967 | Prem | 310—11 |

DAVID X. SLINEY, Primary Examiner